Oct. 26, 1948.    L. F. ATHY    2,452,515
METHOD OF MAKING GEOPHYSICAL EXPLORATIONS
Filed Dec. 13, 1943
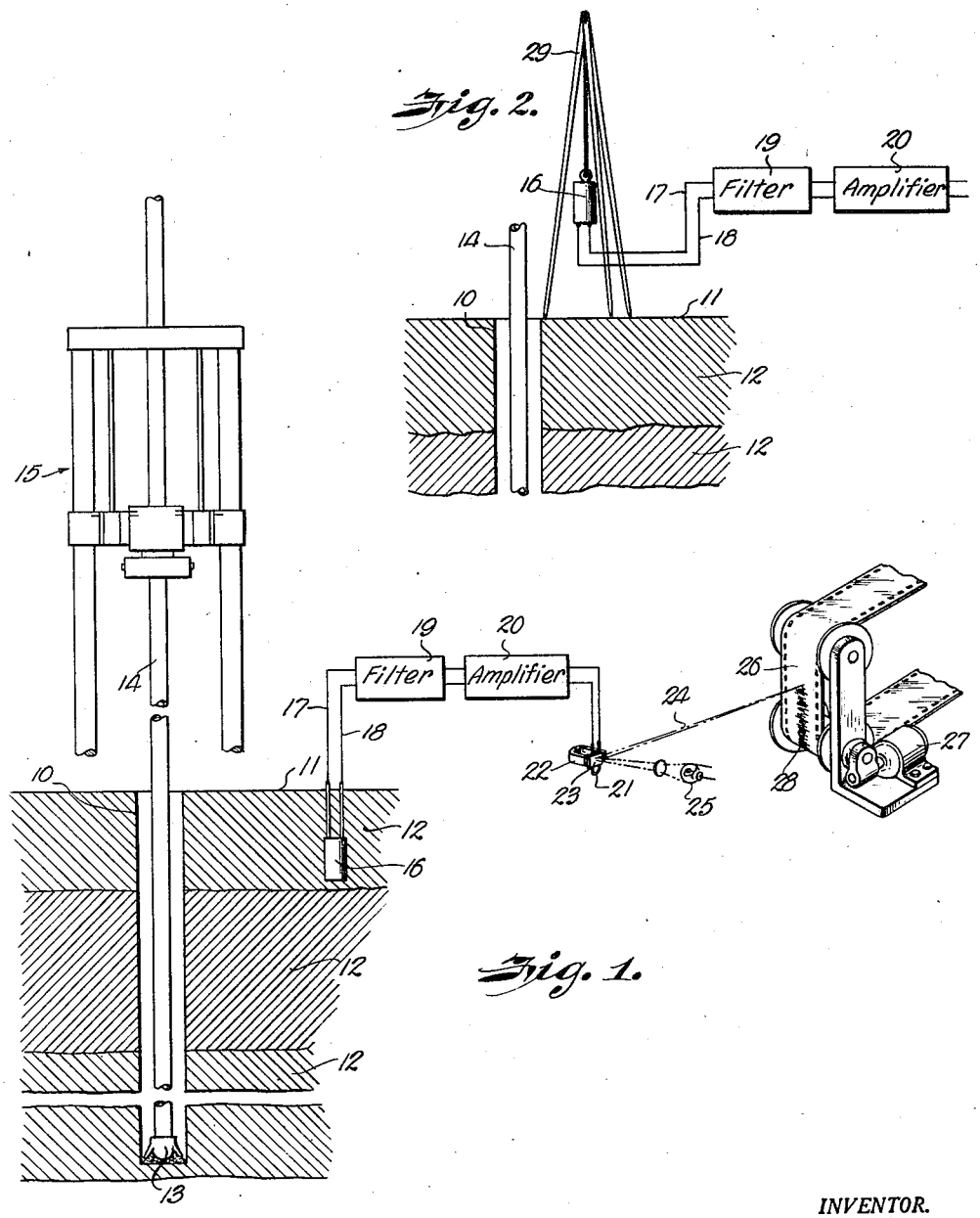
INVENTOR.
Lawrence F. Athy
BY
ATTORNEY.

Patented Oct. 26, 1948

2,452,515

UNITED STATES PATENT OFFICE 2,452,515

METHOD OF MAKING GEOPHYSICAL EXPLORATIONS

Lawrence F. Athy, Ponca City, Okla., assignor to Continental Oil Company, Ponca City, Okla., a corporation of Delaware Application December 13, 1943, Serial No. 514,061

5 Claims. (Cl. 181—0.5)

My invention relates broadly to new and useful improvements in a method of logging and correlating the various tectonic formations or horizons through which well bores are drilled and more particularly to a method of logging bore holes by means of seismic or air waves produced by the vibrations which occur during the drilling operations.

It is of great geological and economical importance in seeking petroleum or mineral deposits to determine the depth and nature of the subsurface formations. These determinations are made by correlating various characteristics of the formations penetrated by the well bore either at intervals during drilling or after the drilling operations have been completed.

In the prior art, various methods have been devised for obtaining and recording identifying characteristics of the various beds penetrated during drilling. Perhaps the best known and most widely used method is to take cores periodically during drilling of the well bore. However, this is a tedious operation. Moreover, this method cannot be used to ascertain the exact depth or thickness of the respective formations since the operator cannot tell where one stratum ends and another begins. Another method commonly used determines the character of the beds by measuring their resistance to electric currents. However, the drilling operations must be interrupted when the bore is being logged by this method. In fact, the usual procedure is to make the log after the hole has been drilled; and, when this is done, it is impossible to determine the character of a formation at the time it is being drilled or to tell when the drill is approaching an oil or gas bearing formation.

I have now discovered a method of accurately logging a well bore simultaneously with the drilling operations. I do this by recording and correlating various characteristics of seismic and air waves produced by the vibrations which occur during drilling. Rock material varies greatly in its composition. Some rock materials are porous and others are dense. Some are soft while others are extremely hard. These different rock materials possess different capabilities of transmission. Each type of rock produces a characteristic sound vibration when it is being drilled. These sound vibrations can create distinctive seismic waves in the soil and rock formations around the well bore and in the air in the vicinity of the drilling rig. These seismic and air waves can be converted to electrical waves or impulses and recorded on a photographic film by means well known to the art. These recorded wave forms have distinguishing characteristics that can be correlated and associated with particular types of rock material. By properly correlating the wave chart with the depth of the well bore it is possible to accurately ascertain the various beds penetrated by the bore and to determine the thickness of the respective beds.

My method of logging well bores is superior to prior art methods in that it shows not only the depth and character of the various beds penetrated by the bore, but also the thickness of each bed. Moreover, it accurately logs the bore as it is drilled, thus permitting the nature of the various beds penetrated to be immediately ascertained. This materially reduces probability of a blow-out caused by drilling unexpectedly into a high pressure gas formation. In addition to the above, the apparatus used in practicing my invention can be disposed a sufficient distance from the well bore so as not to interfere with the drilling equipment or the drilling operations.

In the drawing forming a part of this specification and wherein like numerals are employed to designate like parts throughout the same, Fig. 1 is a diagrammatic view illustrating apparatus capable of carrying out my improved method and showing the same disposed to respond to seismic waves near the ground surface, and Fig. 2 is a fragmentary diagrammatic view illustrating the apparatus disposed to respond to air waves.

In the accompanying drawings, wherein for the purpose of illustration is shown a preferred embodiment of my invention, the numeral 10 designates a well bore which extends from the ground surface 11 through various beds or horizons 12. The bore 10 is formed by a bit 13 at the lower end of a string of drill pipe 14 which is rotated by conventional drilling equipment at the ground surface. A portion of the drilling equipment is shown at 15. When the bit 13 is rotated it produces vibrations in the string of drill pipe 14 and drilling equipment 15. These vibrations are also transmitted through the ground around the well bore in the form of seismic waves and through the atmosphere about the drilling equipment in the form of air waves. I have discovered that the frequency and other characteristics of the air and seismic waves produced by the vibrations vary sufficiently in accordance with the particular formation being drilled to permit this formation to be readily identified.

In the embodiment of the invention shown in Fig. 1 a seismophone 16 is buried a short distance below the ground surface and adjacent to the well bore 10. In seismophone 16 the seismic waves traversing the ground are converted or translated to electrical waves and transmitted by conductors 17 and 18 through a filter 19 and an amplifier 20 to a coil 21 suspended in the field of a permanent magnet 22. Coil 21 oscillates in sympathy with the frequency of the electrical impulses flowing therethrough and the mirror 23 carried by the coil projects a beam of light 24 from lamp 25 onto the strip of photographic film 26 which is moved at a constant speed by a motor 27. The light beam 24 produces a trace 28 on the moving film 26 which constitutes a visible record of the current frequencies and wave form produced by the formation being drilled. By studying amplitude variations, frequency changes and general wave forms, a person skilled in the art can readily determine the type of rock material which produces the wave.

Since the apparatus for translating, amplifying and recording the seismic wave is conventional in the art, it is unnecessary to illustrate or describe it in greater detail.

In Fig. 2 I have shown the apparatus disposed to pick up air waves created by the drilling vibrations. The seismophone 16 is supported above the ground in proximity to the bore hole 10 by any suitable means such as the tripod 29. When thus mounted, air waves impinging against the seismophone 16 are translated to electrical impulses which are filtered, amplified and recorded in the same manner as the seismic waves.

In practice, it is impractical to record continuously since it may require months to complete the well. Accordingly, I prefer to operate the device at selected vertical intervals in the well bore. Where this is done, a suitable means is provided for operating the photographic recording means synchronously with drill penetration. For example, the recording means can be operated for a period of one second at five foot intervals in the well bore. The particular wave form or trace made by the recording equipment is thus correlated with the depth of the well bore making it possible to readily determine the nature of the formation being drilled and to determine the exact depth of the formation.

As an alternative method of logging the well bore, the photographic recording equipment can be operated for short periods of time throughout the drilling operation by means of a time mechanism correlated with means for indicating the depth of the well bore. For example, the recording equipment can be operated for a period of one second at thirty minute intervals. If the depth of the well bore is known and recorded simultaneously with the trace 28 the nature and depth of the particular bed or horizon can be easily determined.

It is to be understood that the form of the invention herewith shown and described is to be taken as a preferred example of the same and that various changes in the size, shape and arrangement of parts may be resorted to without departing from the spirit of my invention or the scope of the appended claims.

Having thus described my invention, I claim:

1. The method of determining the nature of subterranean strata which comprises drilling through such strata and thereby creating significantly different physical waves while traversing significantly different strata respectively, translating such physical waves into correspondingly significantly different electrical impulses, and recording such electrical impulses.

2. The method of determining the nature of subterranean strata which comprises drilling through such strata and thereby creating significantly different physical waves while traversing significantly different strata respectively, receiving said significantly different physical waves directly from the ground and translating such physical waves into correspondingly significantly different electrical impulses, and recording identifying characteristics of such electrical impulses.

3. The method of determining the nature of subterranean strata which comprises drilling through such strata and thereby creating significantly different physical waves while traversing significantly different strata respectively, translating such physical waves into correspondingly significantly different electrical impulses, filtering out all but selected frequencies of such electrical impulses, and amplifying and recording identifying characteristics of such selected electrical impulses.

4. The method of determining the nature of subterranean strata which comprises drilling a hole through such strata whereby significantly different physical waves are created while traversing significantly different strata respectively, translating such physical waves into correspondingly significantly different electrical impulses, and recording identifying characteristics of such electrical impulses.

5. The method of determining the nature of subterranean strata which comprises drilling a hole through such strata whereby significantly different physical waves are created while traversing significantly different strata respectively, translating such physical waves into correspondingly significantly different electrical impulses, filtering out all but selected frequencies of such electrical impulses, and amplifying and recording identifying characteristics of such selected electrical impulses.

LAWRENCE F. ATHY.

REFERENCES CITED

The following references are of record in the file of this patent:

UNITED STATES PATENTS

| Number | Name | Date |
| --- | --- | --- |
| 602,422 | Batcheller | Apr. 19, 1898 |
| 1,654,819 | Kinley | Jan. 3, 1928 |
| 1,790,080 | Stanton | Jan. 27, 1931 |
| 2,089,983 | Ricker | Aug. 17, 1937 |
| 2,156,052 | Cooper | Apr. 25, 1939 |
| 2,235,089 | Sparks | Mar. 18, 1941 |
| 2,255,721 | Mattingly et al. | Sept. 9, 1941 |